July 2, 1963 P. BERTELL 3,096,061
SUPPORT FOR MOUNTING A REAR VISION MIRROR ON A WINDSHIELD
Filed June 28, 1961
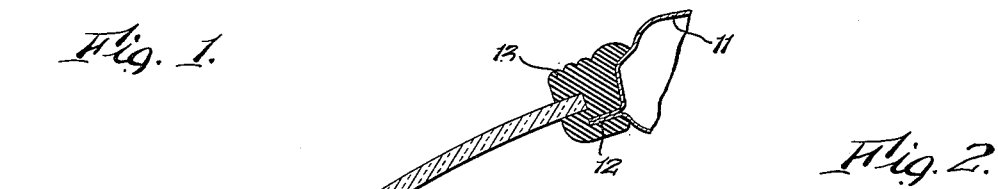
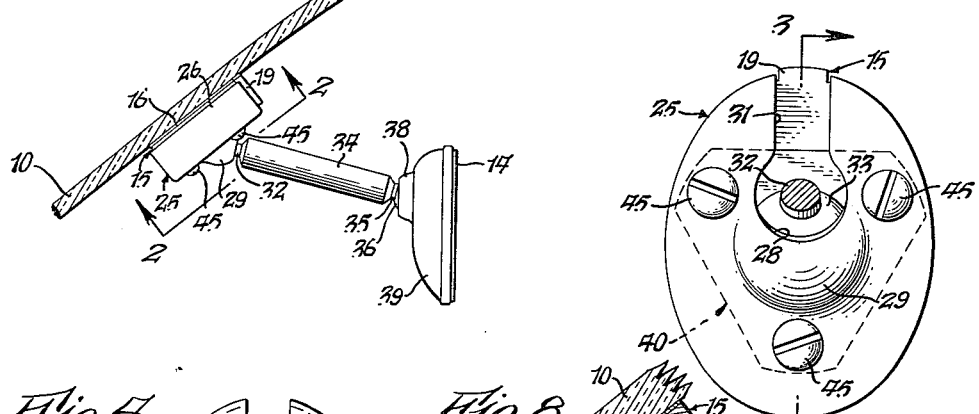
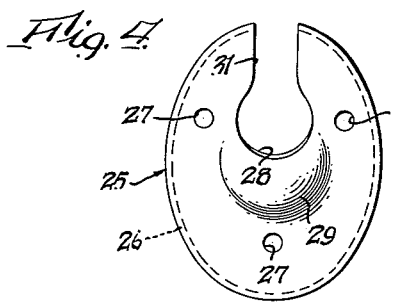
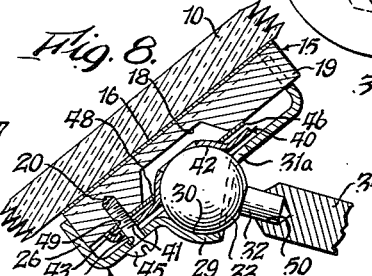
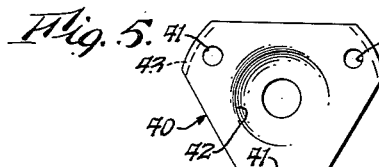
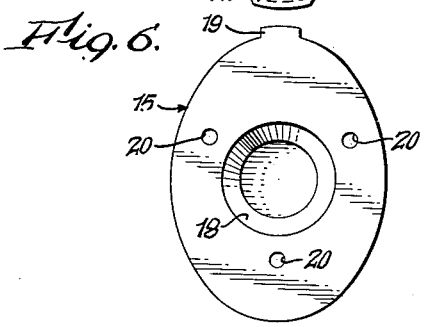
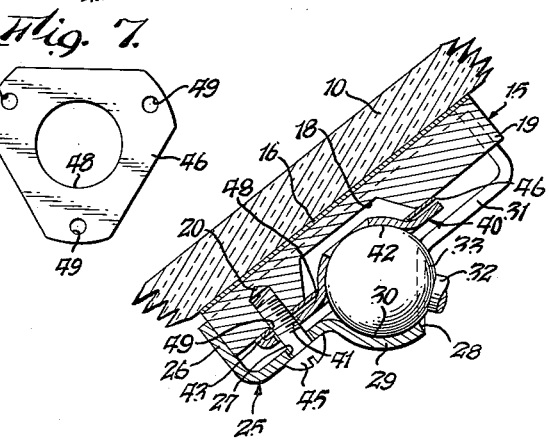
INVENTOR.
Paul Bertell
BY
Popp and Sommer
Attorneys

United States Patent Office 3,096,061
Patented July 2, 1963

3,096,061
SUPPORT FOR MOUNTING A REAR VISION MIRROR ON A WINDSHIELD
Paul Bertell, Williamsville, N.Y., assignor to Standard Mirror Company, Inc., Buffalo, N.Y., a corporation of New York
Filed June 28, 1961, Ser. No. 120,288
4 Claims. (Cl. 248—288)

This invention relates to a support for mounting a rear vision mirror directly on the windshield of an automobile and more particularly to such a support the base for which is cemented directly on the inside face of the windshield.

The trend toward windshields having a pronounced back sweep results in the top part of the windshield being at an angle of approximately 40° to the horizontal and extending well back along the roof of the automobile. This complicates the problem of mounting the rear vision mirror on the frame of the automobile since it is desirable to have the rear vision mirror near the center of the car and above but well in front of the eyes of the driver. This location is considerably distant from the frame of the automobile with a windshield having such a pronounced back sweep.

It has been heretofore proposed to mount the rear vision mirror directly on the glass windshield by cementing its base to the windshield. However, when this is done it is desirable that the base be cemented on the windshield before the windshield is attached in the car body, and under these circumstances it is desirable to have this base shallow to facilitate nesting of the windshields for storing and packaging.

It is a principal object of the present invention to provide a support for a rear vision mirror including a base having one face adapted to be cemented to the inside of a glass windshield in which the base projects such short distance from the windshield that it does not interfere with present normal cartoning of windshields.

It is another important object to provide such a support which securely holds the rear vision mirror to the windshield and provides a vibration free mounting therefor.

It is another important object of the invention to provide such a support in which the base and other parts of the mounting are of minimum size so as not to interfere with the forward view of the driver through the windshield.

Another object of the invention is to provide such a rear vision mirror assembly which, except for the base, can be prefabricated and quickly applied to the base at the automobile assembly plant.

Another object of the invention is to provide such a rear vision mirror support which permits the rear vision mirror to be moved a wide distance up and down as well as horizontally and also permits the rear vision mirror to be adjusted through a wide angle about both vertical and horizontal axes to adapt its use to all heights of drivers as well as to their position.

Another object is to provide such a mounting which is attractive in appearance and provides a desirable accessory conforming to the swept back windshields.

Other objects and advantages of the invention will be apparent from the following description and drawings in which:

FIG. 1 is a fragmentary vertical section through the upper part of the swept back windshield and its mounting to the roof of an automobile and showing, in side elevation, a rear vision mirror support embodying the present invention.

FIG. 2 is an enlarged section taken generally on line 2—2, FIG. 1.

FIG. 3 is a fragmentary vertical central section through the support embodying the present invention and the adjacent part of the windshield, this section being taken generally on line 3—3, FIG. 2.

FIG. 4 is an elevational view of the exterior face of the cap which forms a part of the support.

FIG. 5 is a plan view of the spring or bridge plate which also forms a part of the support and which provides the required frictional resistance to displacement of the rear vision mirror when once adjusted.

FIG. 6 is a plan view of the block or casting which forms the base of the support and which is cemented to the windshield.

FIG. 7 is a plan view of the fibersheet or disk which can be used to hold the parts of the assembly together and to accurately locate the attaching screws and thereby facilitate the assembly of the rear vision mirror to the base.

FIG. 8 is a fragmentary vertical central sectional view similar to FIG. 3, but on a reduced scale, illustrating a modified form of rear vision mirror.

The rear vision mirror support forming the subject of the present invention is particularly adapted to be used in conjunction with an automobile having a windshield 10 the upper part of which has the pronounced back sweep illustrated in FIG. 1 and which results in the upper part of the windshield having an angularity of 40° or less with reference to the horizontal end forming a part of the roof of the automobile. The roof frame is illustrated at 11 as having a flange 12 projecting into the windshield opening and as fitting into the rubber rim or frame 13 of the windshield in a manner to obtain a substantially weather-tight mounting for the windshield.

In order to mount the rear vision mirror panel 14 at a desirable elevation in the center of the automobile well in advance of the driver it has heretofore been proposed to cement the base of its support directly to the windshield. With the present invention the base is indicated at 15 and the layer of cement uniting this base to the windshield 10 is indicated at 16. With the present invention the base 15 is of vertically elongated oval form as shown in FIG. 6 and it protrudes a minimum distance from the windshield. In accordance with the present invention the block or casting 15 forming the base of the support is centrally provided in its face remote from that adhered to the windshield with a concavity 18. The base is also shown as provided at its top with an upwardly projecting lug 19 which serves as a locating lug as hereinafter described. This base is also shown as provided with one or more threaded screw holes 20 for the purpose of attaching a cap plate indicated generally at 25.

This cap plate 25 is shown as being made of sheet metal and as having a laterally projecting marginal flange 26 adapted to embrace the periphery of the base 15. This cap plate is also shown as having unthreaded screw holes 27 in register with the threaded screw holes 20 of the base. This cap plate is also shown as having a central through opening 28 through an outwardly projecting offset 29 which offset forms a spherical concavity 30 which opposes the concavity 18 of the base plate 15. The central opening 28 is also shown as being continued upwardly in the form of a slot 31 which extends through the rim of the top part of the marginal flange 26 of the cap plate 25. The slot 31 is slightly narrower in width than the central through opening 28 and is of a width to receive the neck 32 of a ball 33 at one end of an arm 34. The other end of this arm 34 is formed to provide a similar reduced neck 35 for a second ball 36 the latter working in a socket 38 in the rear of a casing or housing 39 for the rear vision mirror 14. The ball and socket 36, 38 permit of angular adjustment of the mirror panel 14 about vertical and horizontal axes to obtain the desired aim and the ball and socket 33, 30 permit the angular movement of the arm 34 both horizontally and vertically to obtain any desired position of the mirror panel 14.

To this end the ball 33 is held in frictional engagement with the socket 30 by a spring plate indicated generally at 40. This spring plate is shown as having unthreaded holes 41 in register with the screw holes 20, 27 in the base 15 and cap plate 25, respectively. This spring plate is also shown as having a central spherical concavity 42 which opposes the spherical concavity 30 of the cap plate 25 and forms a seat for the opposite side of the ball 33. Means are also provided for holding this spring plate 40 in pressure contact with the ball 33. While these means can be of various forms they are shown as comprising legs 43 projecting laterally from the spring plate at spaced intervals around the margin thereof and having edge pressure contact with the base 15 and thereby produce a spring bridge.

The cap plate 25 is shown as secured to the base 15 by screws 45. These screws are shown as being three in number and as extending through the several pairs of unthreaded holes 27 and 41 of the cap plate 25 and spring plate 40, respectively, and anchored in the threaded holes 20 of the base 15. It will be understood, however, that various alternate ways can be adopted for securing the cap plate 25 to the base 15.

Merely for the purpose of holding the screws 45 in position and accurately located with reference the screw holes 20 in the base 15, a small fiber disk or sheet 46 can be employed. This sheet 46 has a large central opening 48 fitting around the offset central portion of the spring plate 40 and having holes 49 in which the screws 45 anchor. However, these holes do not interfere with the turning of these screws in attaching the support to the base plate 65 as hereinafter described.

In fabricating the support forming the subject of the present invention, the base 15 may be secured by cement 16 to the windshield 10 at the glass plant where the windshield is made. It is a feature of the invention that this base 15 projects from the windshield 10 such small distance as not to interfere with nesting of these windshields in storing or packaging the same.

The balance of the support forming the subject of the present invention is fabricated at the plant where the rear vision mirror assemblies are made. At this plant the mirror panel 14 is assembled in its case or housing 19 and the socket 38 of this case is frictionally attached to the ball 36 of the arm 34 in any usual and well known manner.

The stem 32 at the opposite end of this arm 34 is then threaded through the slot 31 from the open end thereof and its ball 33 is brought to the central opening 28 and against the spherical socket 30 of the cap plate 25. The spring plate 40 is then placed with its spherical socket 42 against the opposite side of the ball 33 and the fiber sheet or disk 46 placed around the bulge of this spring plate 40 and the holes 49, 41 and 20 of this fiber sheet 46, spring plate 40 and cap plate 15 brought into register with one another and the screws 45 passed through these holes to be anchored in the holes 49 of the fiber plate 46 which serves to hold all of these parts in assembled relation while being shipped to the automobile assembly plant.

With the form of the invention illustrated in FIG. 8, the stem 32 and arm 34 are made of individual pieces which may be assembled by threading the stem 32 through an opening 31a in the cap plate 25 to be received in a blind bore 50 provided in the arm 34.

At the automobile assembly plant each windshield is assembled in its openings by means of the rubber rim or frame 13 and the rear vision mirror assembly is placed against the base part 15 in such manner as to cause the locating lug 19 of this base to enter the outer part of the slot 31 of the cap plate 25. This automatically locates the several screws 45 in approximate position to enter and anchor in the threaded holes 20 of the base 15. Upon turning the screws 45, the cap plate 25 is attached to the base 15. With the form of the invention illustrated this also serves to bring the legs 43 of the spring plate 40 into pressure contact with the base 15, these legs serving as a means providing pressure contact between the spring plate 40 and the ball 33. This pressure contact holds this ball 33 in pressure contact with socket 30 of the cap plate 25 and this pressure contact is of such value as to provide the desired resistance to movement of the arm 34 so that this arm can be manually moved vertically and horizontally to any position but which holds this arm in the selected position in a firm and vibration-proof manner.

From the foregoing it will be seen that the present invention achieves the various objectives heretofore set forth particularly in allowing the bases for the rear vision mirrors to be attached to the windshields in such manner as to provide convenient and economical packaging and storing of the windshields by nesting.

I claim:

1. A support for supporting a rear vision mirror assembly from the glass windshield of a vehicle, said rear vision mirror assembly including an attaching ball and a neck connecting said attaching ball with the rear vision mirror, comprising a base having one broad face adapted to be secured directly to the inside face of said windshield and having a central concavity in its opposite face, a cap plate member having a laterally projecting marginal flange means along opposite sides of the periphery of said base and having a central through opening alongside an internal spherical concavity opposing said concavity of said base, said mounting ball being arranged in said concavities in contact with said spherical concavity of said cap plate member and with said stem projecting out through said central through opening, a sheet metal spring plate member interposed between said base and cap plate member and having a central portion offset into said concavity of said base and providing spherical concavity in contact with said mounting ball, and means securing said plate members to said base and providing pressure contact of said spring plate member against said ball.

2. A support as set forth in claim 1 wherein said central through opening is in the form of a slot extending from the center of said cap plate member to the margin thereof and of a width greater than the thickness of said neck whereby said neck can be threaded through said slot to bring said mounting ball into contact with the spherical concavity of said cap plate.

3. A support as set forth in claim 2 additionally including a locating lug projecting from said base part into said slot.

4. A support as set forth in claim 1 wherein said base is in the form of a block casting and wherein said cap plate is made of sheet metal.

References Cited in the file of this patent

UNITED STATES PATENTS

| 1,283,164 | Hammond | Oct. 29, 1918 |
| 1,771,061 | Rice | July 22, 1930 |
| 2,157,613 | Hodny | May 9, 1939 |
| 2,613,575 | Falge | Oct. 14, 1952 |

FOREIGN PATENTS

| 1,226,901 | France | Feb. 29, 1960 |